United States Patent [19]
Wada

[11] Patent Number: 5,507,359
[45] Date of Patent: Apr. 16, 1996

[54] ELECTRICALLY OPERATED POWER STEERING CONTROL DEVICE

[75] Inventor: Shunichi Wada, Hyogo, Japan

[73] Assignee: Mitsubishi Denki Kabushiki Kaisha, Tokyo, Japan

[21] Appl. No.: 287,934

[22] Filed: Aug. 9, 1994

[30] Foreign Application Priority Data

Nov. 18, 1993 [JP] Japan .................................. 5-289305

[51] Int. Cl.$^6$ ...................................................... B62D 5/04
[52] U.S. Cl. ...................................... 180/79.1; 364/424.05
[58] Field of Search ........................ 180/79.1; 364/424.05

[56] References Cited

U.S. PATENT DOCUMENTS

| | | | |
|---|---|---|---|
| 4,687,976 | 8/1987 | Shimizu | 180/79.1 |
| 4,736,810 | 4/1988 | Morishita et al. | 180/79.1 |
| 4,869,334 | 9/1989 | Marumoto et al. | 180/79.1 |
| 4,959,787 | 9/1990 | Morishita et al. | 180/79.1 |
| 5,201,818 | 4/1993 | Nishimoto | 180/79.1 |
| 5,253,725 | 10/1993 | Nishimoto | 180/79.1 |

Primary Examiner—Karin L. Tyson
Attorney, Agent, or Firm—Sughrue, Mion, Zinn, Macpeak & Seas; Richard C. Turner; John F. Rabena

[57] ABSTRACT

A signal corresponding to steering torque detected by a torque detector is inputted into both a control device and a torque signal direction determining device 19. Only when the signal directions of both device are coincident, a signal to drive a motor in that direction is outputted from a motor drive circuit. In this case, even when the steering torque is in a dead zone, a signal of a predetermined direction can be outputted from the torque signal direction determining device by a switching signal. Accordingly, in the power steering control device, even when a torque direction signal sent from the direction determining device is in a dead zone, a signal for driving the motor to assist a steering shaft with rotation is made to be outputted in a predetermined direction, so that steering feelings can be improved when a steering wheel is suddenly reversed.

6 Claims, 6 Drawing Sheets

SIGNAL OF TORQUE SIGNAL DIRECTION
DISCRIMINATING MEANS

ELECTRICALLY OPERATED POWER STEERING CONTROL DEVICE

BACKGROUND OF THE INVENTION

1. Field of the Invention

The present invention relates to an electrically operated power steering control unit for improving the safety of control when two systems of motor torque direction determine device are provided.

2. Description of the Prior Art

A conventional electrically operated power steering control unit is proposed in Japanese Unexamined Patent Publication (Kokai) Hei-1-257676.

The conventional electrically operated power steering control unit disclosed in the above publication is shown in FIG. 5.

The conventional electrically operated power steering control unit includes a steering torque detector 1 (referred to as a torque detector hereinafter), motor control circuit 2, motor 3, and clutch 4.

The torque detector 1 is used for detecting a torque generated when the steering wheel of an automobile is operated.

In accordance with this steering torque, an assist torque is determined by the motor control circuit 2, and the motor 3 generates this assist torque to assist the steering shaft with rotation. Then the rotation of the motor 3 is transmitted to a steering shaft through the clutch 4 and a reduction mechanism (not shown in the drawing). In this way, the assistant steering power is supplied to the steering shaft in the steering operation.

Next, the construction of the motor control circuit 2 will be explained with reference to the operation of each component.

The output of the torque detector 1 is sent to input terminals 5A, 5B, and inputted into a microcomputer 7 (referred to as a CPU hereinafter) as a control means directly or through a phase compensation circuit 6. The phase compensation circuit 6 conducts a phase-compensating operation on an output signal corresponding to the steering torque sent from the torque detector 1, and then the compensated signal is sent to the CPU 7.

A signal outputted from the CPU 7 is sent to a rightward interface circuit 8 for driving the motor to the right, a leftward interface circuit 9 for driving the motor to the left, and a digital-to-analog conversion circuit 10 in accordance with the direction and magnitude of the steering torque. A second rightward drive signal 8B for driving the motor to the right sent from the CPU 7 is inputted into a motor drive circuit 11 through the rightward interface circuit 8. In this connection, a first rightward drive signal for driving the motor to the right will be described later. In the same manner, a second leftward drive signal 9B for driving the motor to the left sent from the CPU 7 is inputted into the motor drive circuit 11 through the leftward interface circuit 9. In this connection, a first leftward drive signal for driving the motor to the left will be described later.

The output of the motor drive circuit 11 is sent to the motor 3 through output terminals 12A and 12B.

Although not illustrated in the drawing, the motor drive circuit 11 is constructed in the following manner: For example, four power elements such as four pieces of FET are connected to form a bridge circuit, and two of the power elements are used for driving the motor to the right, and the residual two of the power elements are used for driving the motor to the left. The second rightward drive signal 8B is inputted into one of the two power elements for driving the motor to the right, and the first rightward drive signal 8A, which will be described later, is inputted into the other power element. In the same manner, the first and second drive leftward signals 9A and 9B are inputted into the two power elements for driving the motor to the left. Only when two pieces of FET used for the rotation in the same direction are concurrently inputted with a signal, the motor generates a torque so as to be rotated in that direction.

In this connection, reference numeral 13 is an error amplifier, and one of the input terminals of the error amplifier 13 is inputted with a torque output signal of the CPU 7 after the torque output signal has been converted into an analog signal by the digital-to-analog conversion circuit 10. The other input terminal of this error amplifier 13 is inputted with an output signal outputted from a motor current detection circuit 14 by which a current corresponding to an actual assist torque is detected when a voltage corresponding to the assist torque sent from the motor drive circuit 11 by the action of a resistor 15 for detection, is taken in. Then error amplifier 13 amplifies an error between the output of the digital-to-analog conversion circuit 10 and the output of the motor current detection circuit 14, and the amplified error is outputted into one of the input terminals of a PWM (pulse width modulation) modulator 16 of the next stage.

The other input terminal of the PWM modulator 16 is inputted with an output of a PWM oscillation circuit 17 which is used as a reference oscillator. In the PWM modulator 16, the output of the error amplifier 13 and the output of the PWM oscillation circuit 17 are compared, and a PWM signal of the motor 3 is generated for the motor drive circuit 11.

Reference numeral 18 is a clutch driver, which receives an output from the CPU 7 and usually sends an ON signal to the clutch 4 through output terminals 18A, 18B so that the motor 3 and the steering shaft can be connected.

Reference numeral 19 is a motor rotational direction determining device, which includes a torque signal direction determining circuit 19A. This torque signal direction determining circuit 19A is inputted with an output signal of the torque detector 1. By this output signal, the rightward and leftward drive signals 19B and 19C are outputted from the torque signal direction determining circuit 19A. This rightward drive signal 19B is inputted into the second input terminal of an AND circuit 20A of two inputs which is a coincidence determining device, and the leftward drive signal 19C is inputted into the second input terminal of an AND circuit 20B.

Also, the first rightward drive signal 8A outputted from the rightward interface circuit 8 is inputted into the first input terminal of the AND circuit 20A, and the second leftward drive signal 9A outputted from the leftward interface circuit 9 is inputted into the first input terminal of the AND circuit 20B.

When the two inputs are in an AND condition, the outputs of the AND circuits 20A and 20B are used for directing the drive direction of the motor 3, and these outputs are sent to the motor drive circuit 11.

Next, with reference to FIG. 6, a specific example of the torque signal direction determining circuit 19A will be explained as follows.

In the drawing, reference numeral 21 is an input terminal into which an output signal of the torque detector 1 shown in FIG. 5 or a signal subjected to phase compensation by the phase-compensation circuit 2 is inputted. This input terminal 21 is connected with a positive (+) input terminal of a comparator 22 which is a rightward signal detection circuit, and also connected with a negative (−) input terminal of a comparator 23 which is a leftward signal detection circuit. Resistors 26 to 28 for generating a reference voltage are connected in series between the positive voltage side 24 and the ground side 25. Reference voltage E1 obtained at a junction between the resistors 26 and 27 is impressed upon the negative (−) input terminal of the comparator 22. Reference voltage E2 obtained at a junction between the resistors 27 and 28 is impressed upon the positive (+) input terminal of the comparator 23. Then the rightward drive signal 19B is outputted from the comparator 22, and the leftward drive signal 19C is outputted from the comparator 23.

By the power steering control unit described above, the output characteristics shown in FIG. 7 can be obtained in the torque detector 1. In FIG. 7, the horizontal axis represents lateral steering torque, and the vertical axis represents a torque output signal. In FIG. 7, T1 is a starting point of a leftward steering torque control, and T2 is a starting point of a rightward steering torque control. A region between T1 and T2 is a dead zone (neutral region) of steering torque, the center of which is located at T0. Corresponding to the steering torques shown on the horizontal axis, the outputs shown in the vertical axis are obtained as illustrated in FIG. 7. In this case, V1 is an output of the leftward control starting point, V2 is an output of the rightward control starting point, and a point in the proximity of V0, that is, a point between V1 and V2, is an output of the neutral point. The torque output characteristics are approximately linear in the control range.

FIG. 8 shows an example of the control output characteristics of the motor. In the drawing, the horizontal axis represents a torque output signal, the vertical axis represents a motor output, and a region between torque outputs V1 and V2 is a dead zone in which the motor output is not outputted. When the leftward torque output is V1, a signal to control the motor 3 to the left is outputted. When the motor output exceeds V4, the motor output is saturated so that the motor output is controlled to be a constant value ($P_{max}$). On the other hand, when the rightward torque output is V2, a signal to control the motor 3 to the right is outputted. When the motor output exceeds V3, the motor output is saturated so that the motor output is controlled to be a constant value ($P_{max}$). The motor output is approximately linearly changed between V1 and V4, and also between V2 and V3. In this example, even when the torque signal is the same, a different value of the motor output is outputted according to the vehicle speed. That is, the lower the vehicle speed is, the higher the motor output is increased for controlling.

Next, the overall operations of this power steering control unit will be explained as follows.

When a key switch not shown is turned on, the electromagnetic clutch 4 is turned on, so that the output shaft of the motor 3 and the steering shaft are connected. Next, a torque signal proportional to the steering torque is outputted from the torque detector 1. Then the outputted torque signal is inputted into the CPU 7 directly or through the phase-compensation circuit 6. The CPU 7 outputs the torque signal in the form of a digital signal. Then the outputted digital signal is converted into an analog signal by the digital-to-analog conversion circuit 10.

A level of the torque signal output is judged by the CPU 7. Then the rightward drive signal is inputted into the rightward interface circuit 8 for driving the motor to the right, and the leftward drive, signal is inputted into the leftward interface circuit 9 for driving the motor to the left. The motor drive circuit 11 is inputted with rightward and leftward rotation drive signals so that the rotational direction of the motor is directed, and the torque signal is converted into an analog signal by the digital-to-analog conversion circuit 10. Then the analog signal is inputted into the error amplifier 13, and the output of the error amplifier 13 is further inputted into the PWM modulator 15 of the next stage, so that the signal is modulated by the PWM oscillating circuit 16, and then a control signal, the pulse width of which is proportional to the output of the torque detector 1, is sent to the motor drive circuit 11. When necessary, the level of a motor current is restricted or cut off by the motor current detection circuit 14.

In accordance with the control characteristics shown in FIG. 8, an output signal is sent to the motor 3 from the motor drive circuit 11. According to the inputted signal, the motor 3 is rotated so that an assist power is supplied to the steering shaft.

On the other hand, the output of the torque detector 1 is inputted into not only the CPU 7 but also the torque signal direction determining circuit 19A of the motor rotational direction determining device 19. In accordance with this steering torque signal, the rightward drive signal 19B and the leftward drive signal 19C are outputted. The operation of this torque signal direction determining circuit 19A will be explained as follows:

An output signal sent from the torque detector 1 is inputted into the input terminal 21 shown in FIG. 6, and at the same time, the output signal is also inputted into the comparators 22 and 23 for the rotation of right and left. The level of the inputted signal is compared with the reference voltages E1 and E2 which are different values. When the level of the signal is higher than the reference voltage E1, the signal is inputted into the AND circuit 20A as the rightward drive signal 19B, and when the level of the signal is lower than the reference voltage E2, the signal is inputted into the AND circuit 20B as the leftward drive signal 19C. In this case, the equation E1−E2=E0 is satisfied, and a voltage in the range of E0 is a dead zone voltage at which no drive signals are outputted.

The output from the torque signal direction judgment circuit 19A is inputted into the AND circuits 20A, 20B and then compared with the first rightward and leftward drive signals 8A and 9A sent from the rightward and leftward interface circuits 8 and 9.

As a result of the foregoing, only when both the first rightward drive signal 8A and the rightward drive signal 19B are inputted into the AND circuit 20A, a rightward signal is inputted into the AND circuit 20A from the motor drive circuit 11. In the same manner, only when both the first leftward drive signal 9A and the leftward drive signal 19C are inputted into the AND circuit 20B, a leftward signal is outputted into the AND circuit 20B from the motor drive circuit 11.

Due to the foregoing, for example, in the case where the CPU 7 is in trouble being affected by noise, even when an erroneous rightward signal is generated through the rightward interface circuit 8 although a rightward direction signal is not detected by the torque detector 1, a rightward direction torque is not detected by the torque signal direction determining device 19. As a result, a signal is not outputted from the AND circuit 20A. Therefore, it is possible to prevent the motor 3 from mistakenly rotating to the right. With respect to the left, the circumstances are the same.

In the conventional power steering control unit described above, while an automobile is running under the condition that the steering wheel torque is neutral in a dead zone, no drive signals are outputted from the torque signal direction determining device 19. Accordingly, even when the CPU 7 is out of order and an erroneous signal is outputted from the CPU 7, the motor 3 is not permitted to rotate. Therefore, it is possible to prevent the steering wheel from rotating by itself. As described above, the conventional power steering control unit is excellent, however, it has the following problems.

In the conventional power steering control unit, the motor 3 is not driven in the dead zone of the torque detector 1. Therefore, for example, when the steering wheel is suddenly reversed by itself or the steering wheel is reversed without being rotated by a driver, the steering wheel temporarily rotates in the dead zone of the torque detector 1. Consequently, in this dead zone, the motor 3 is not given an assist torque. For this reason, it is not possible to improve the feeling of power steering by driving the motor in the above conditions.

SUMMARY OF THE INVENTION

It is an object of the present invention to provide an electrically operated power steering control device by which the feeling of power steering can be improved without deteriorating the safety.

The present invention is to provide an electrically operated power steering device comprising: a steering torque detector for detecting a steering torque; a control device for outputting a signal corresponding to the steering torque when a signal corresponding to the steering torque is inputted; a torque signal direction determining device for outputting a signal corresponding to a direction of the steering torque when the steering torque is out of a dead zone which is set close to a neutral point of the steering after an output of the steering torque detector has been inputted into the torque signal direction determining device; a coincidence determining device for outputting a signal when a direction of a signal sent from the control device and that of a signal sent from the torque signal direction determining device are coincident; a motor driver for outputting an assist torque in accordance with signals inputted into the motor driver from the control device and the coincidence determining device; and a motor for assisting the steering shaft with rotation being driven by an output of the motor driver, wherein a signal of a direction corresponding to said steering torque is capable of being outputted from the torque signal direction determining device even in the dead zone when a switching signal is received from the control device.

According to the present invention, usually, in the case where the steering torque is in the dead zone, only when the direction of the output signal outputted from the control device and that of the signal of the torque signal direction determining device are coincident, a drive signal of the predetermined direction is outputted to the motor control device. Accordingly, even when the control device is out of order, it is possible to prevent the motor from rotating in an arbitrary direction. On the other hand, in a predetermined condition, even in the dead zone, the torque signal direction determining device outputs a signal in the predetermined direction by the switching signal sent from the control device. Therefore, the coincidence of the signal direction is determined by the coincidence determining device even in the dead zone, and a signal to rotate the motor in its direction is outputted into the motor driver. Due to the foregoing, in the case where the steering wheel is suddenly reversed by a driver, the steering wheel is assisted with rotation by the motor even in the dead zone.

Further, the width of the dead zone can be varied by the control device. Therefore, in a predetermined condition, the width of the dead zone can be reduced. Due to the foregoing, the steering wheel can be also assisted with rotation in the case where the steering wheel is suddenly reversed so as to change the direction of torque.

Furthermore, the duration of the switching signal by which a signal can be outputted in a predetermined direction even in the dead zone is detected by the signal monitor device. In the case where it is detected by the signal monitor device that the duration exceeds a predetermined period of time, the motor drive is stopped.

Still further, the steering torque detection value is subjected to phase-compensation by the phase-compensation circuit, so that a quick response can be accomplished when the steering torque value is changed.

DETAILED DESCRIPTION OF THE PREFERRED EMBODIMENTS

With reference to the accompanying drawings, preferred embodiments of the present invention will be explained as follows.

The explanation of the same construction as that of the conventional example will be omitted, and only the construction different from that of the conventional example will be mainly explained here.

Embodiment 1

Figure 1:
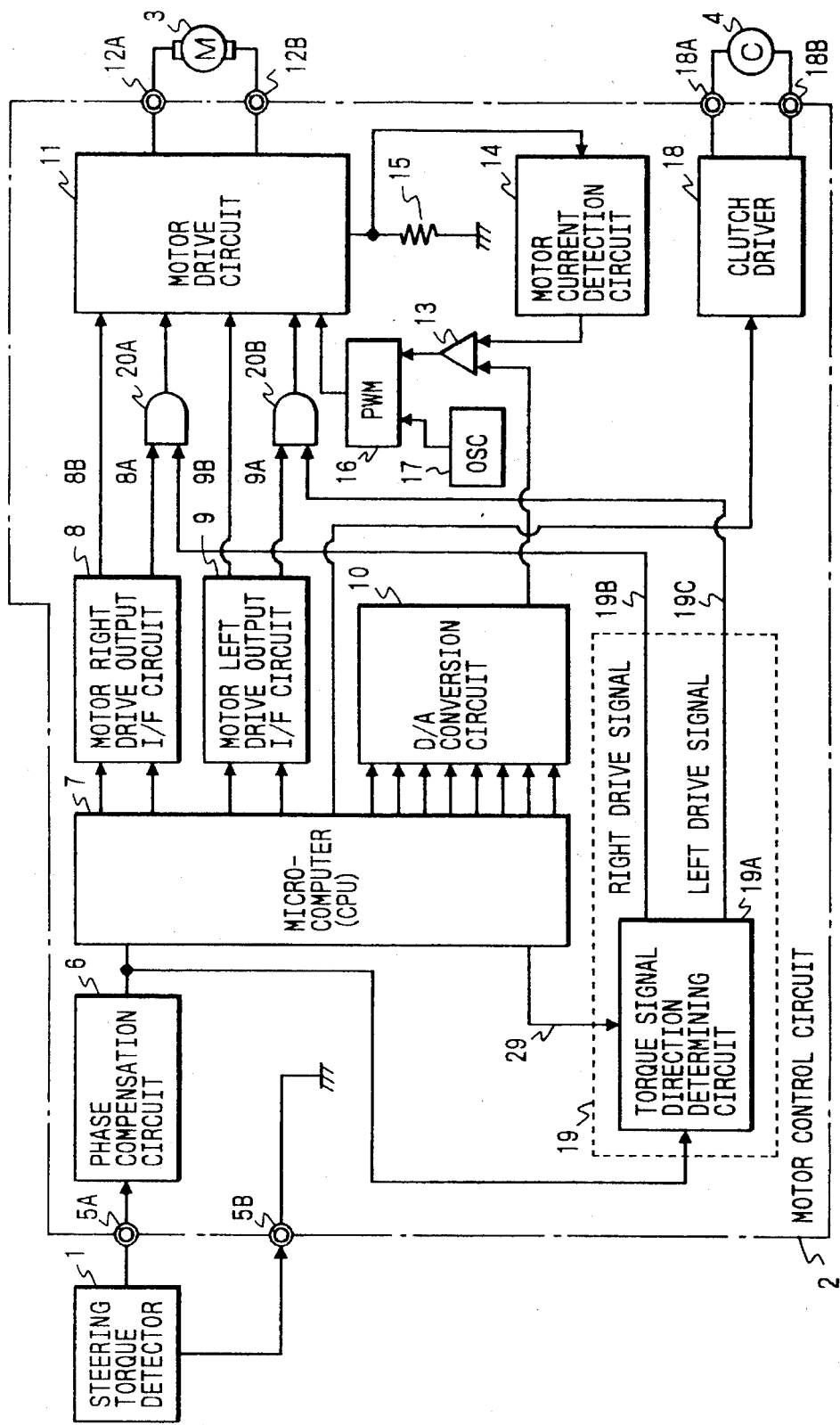
FIG. 1 is a view showing the construction of the power steering control unit of the first embodiment of the present invention.
Figure 2:
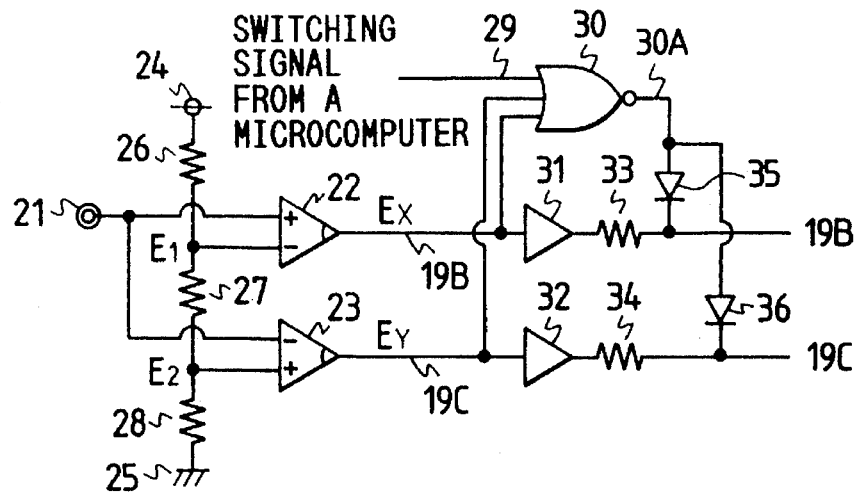
FIG. 2 is a specific circuit diagram of the torque signal direction discriminating means of the power steering control unit.
Figure 3:
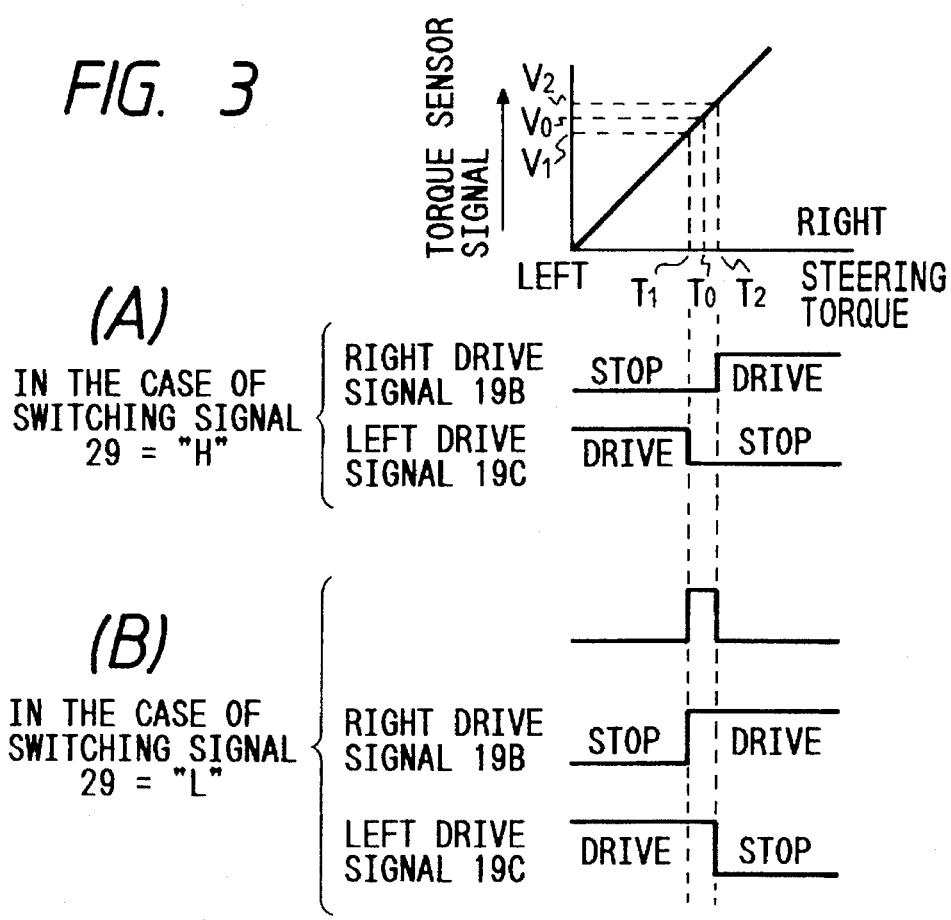
FIGS. 3(a) and 3(b) are views in which a relation between the steering torque and the torque sensor signal is shown and also a manner of drive signal output based on the steering torque is shown, wherein the manner is classified according to the type of the switching signal.

Embodiment 1 is shown in FIGS. 1 to 3.

In FIG. 1, reference numeral 29 denotes a switching signal. This switching signal 29 is used for switching plural types of drive direction signals determined by the detection value detected by the torque detector 1.

That is, the switching signal 29 is outputted from the microcomputer (CPU) 7 so as to command an L (low) output which is one condition for driving the motor 3 in the dead zone, and also to command an H (high) output which is one condition for prohibiting the drive of the motor except for that, wherein the above commands are outputted in accordance with the decision of the microcomputer (CPU) 7 in the case where the feeling of power steering is to be improved when the steering wheel is suddenly reversed by a driver or the steering wheel is reversed without being handled by the driver.

FIG. 2 is a view showing the circuit of the motor rotational direction determining device 19.

Figure 6:
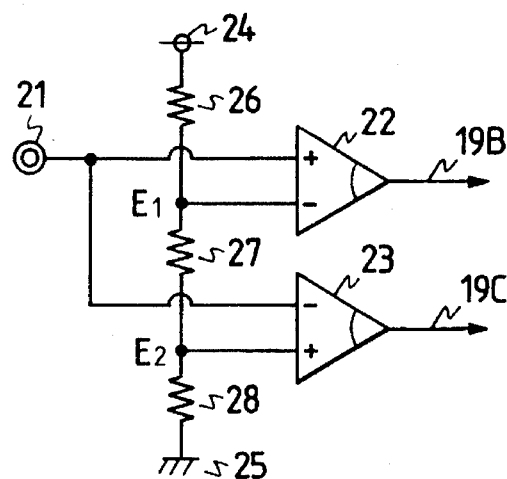
FIG. 6 is a specific circuit diagram of the torque signal direction discriminating means of the above conventional power steering control unit.
Figure 7:
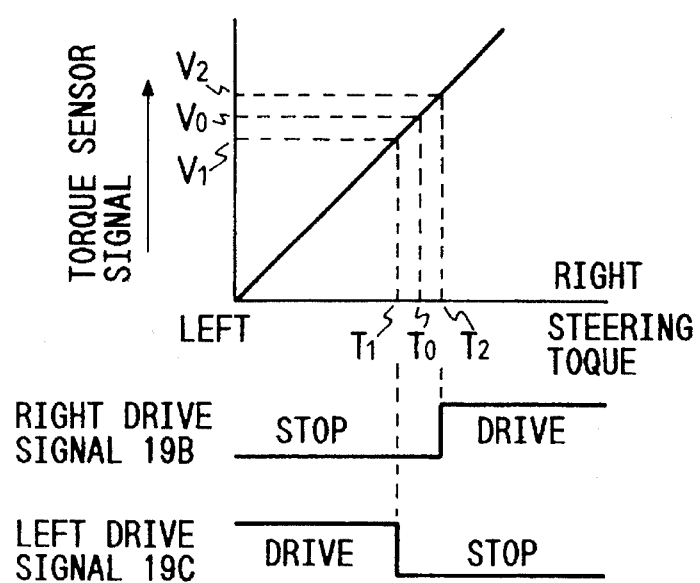
FIG. 7 is a view in which a relation between the steering torque and the torque sensor signal is shown and also a manner of drive signal output based on the steering torque is shown.
Figure 8:
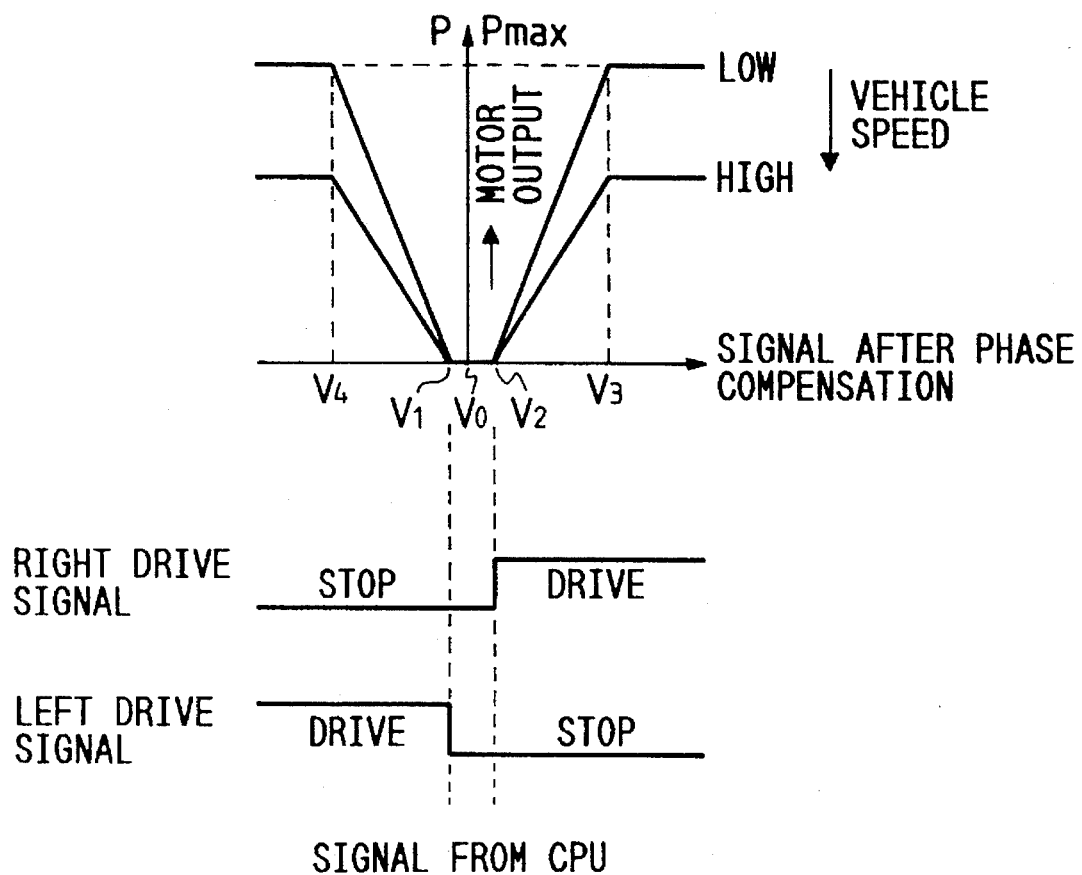
FIG. 8 is a view showing a relation between the steering torque and the output signal sent to the motor from the motor drive circuit.

The construction indicated by the reference numerals 21 to 28 is the same as that of the conventional example shown in FIG. 6.

Reference numeral 30 is an NOR circuit of 3 inputs. Into the NOR circuit 30, are inputted the rightward drive signal 19B sent from the comparator 22 which is the rightward command circuit, the leftward drive signal 19C sent from the comparator 23 which is the leftward command circuit, and the aforementioned switching signal 29.

Reference numerals 31 and 32 are buffer circuits. Into the buffer circuit 31, the rightward drive signal 19B is inputted from the comparator 22. Also, into the buffer circuit 32, the leftward drive signal 19C is inputted from the comparator 23.

Reference numerals 33 and 34 are resistors respectively, electrically connected with the buffer circuits 31 and 32. The buffer circuits 31, 32 prevent the output 30A of the NOR circuit 30 from returning to the input side of the NOR circuit 30, however, the resistors 33, 34 have that function. Therefore, the buffer circuits 31, 32 are not indispensable for the circuit, and they are provided for safety.

Reference numerals 35 and 36 are diodes disposed in the middle of a lead of the output 30A sent from the NOR circuit 30. The diode 35 is connected with a lead on the side of the rightward drive signal 19B, and the diode 36 is connected with a lead on the side of the leftward drive signal 19C.

Next, will be explained the operation for determining the rotational direction of the motor of the power steering control unit constructed in the manner described above.

The explanation will be made in each case as follows. In the case where a steering torque signal detected by the torque detector 1 is not more than T1 as shown in FIG. 3, the leftward drive signal 19C is outputted from the comparator 23 of the torque signal direction determining device 19, and inputted into the AND circuit 20B shown in FIG. 1 through the buffer circuits 32 and others. When the signal coincides with the leftward signal sent from the CPU 7, a leftward torque is given to the motor 3 through the motor drive circuit 11. On the other hand, in the case where the steering torque signal detected by the torque detector 1 is not less than T2, the rightward drive signal 19B is outputted from the comparator 22, and inputted into the AND circuit 20A shown in FIG. 1 through the buffer circuit 31. When the signal coincides with the rightward signal sent from the CPU 7, a rightward torque is given to the motor 3 through the motor drive circuit 11. At this time, the rightward drive signal 19B or the leftward drive signal 19C is also inputted into the NOR circuit 30. Therefore, whatever the type of the switching signal 29 may be, an L (low) output is outputted from the NOR circuit 30.

Next, under the condition that neither the comparator 22 nor the comparator 23 outputs an H (high) signal, that is, under the condition that neither a rightward nor a leftward drive signal is not outputted, an output of the NOR circuit 30 is determined by the switching signal 29 inputted into the NOR circuit 30 from the CPU 7. In this case, when a steering torque signal of the torque detector 1 is close to T0 shown in FIG. 3, it is considered to be in a dead zone. Therefore, as illustrated in part (a) of FIG. 3, the switching signal 29 is usually H (high). Accordingly, a signal sent from the NOR circuit 30 is L (low).

However, when a driver suddenly reverses the steering wheel, or when the steering wheel is returned by itself without being handled by the driver at an end of making a turn, the CPU 7 outputs the switching signal 29 of L shown in part (b) of FIG. 3. Due to the foregoing, the output 30A, which is an H output, is generated by the NOR circuit 30. After this output 30A has passed through the diodes 35 and 36, it is inputted into both the AND circuits 20A and 20B, which are the coincidence determining circuits, as the signals 19B and 19C to permit the drive to the rightward and leftward.

When the driver suddenly reverses the steering wheel as described above, for example, in many cases, under the condition that a rightward steering torque is impressed upon the steering wheel, the steering wheel is suddenly operated by the driver to a position where a leftward steering torque is impressed. When a direction of the steering torque is changed as described above, the steering torque passes through the dead zone between T1 and T2 illustrated in FIG. 3. In this case, when the steering wheel torque is located at a position close to the neutral point T0 in the dead zone (T1 to T2), the CPU usually outputs no drive signal in one direction. However, in the case where the steering wheel torque quickly passes through the dead zone as described above, for example, in the case where the steering wheel torque passes through a point close to the neutral point, a signal corresponding to the steering direction at that time is outputted through the CPU 7.

As a result, for example, in the case where the steering wheel is suddenly rotated from the leftward to the rightward, a signal corresponding to the steering torque required for the right rotation is outputted to one end of the AND circuit 20A from the CPU 7. At this time, the rightward drive signal 19B is also inputted into the other end of the AND circuit 20A from the torque signal direction determining device 19. Therefore, a signal for the motor 3 to generate a rightward assist torque is outputted into the motor drive circuit 11 from the AND circuit 20A.

Due to the foregoing, even when the steering torque passes through a position close to the neutral point in the case where the steering wheel is reversed while the driver does not handle it, an assist torque is given to the steering mechanism by the motor 3, so that excellent steering feelings can be ensured.

In this connection, the condition in which the switching signal 29 becomes L, that is, the condition in which a signal to permit the motor drive of both directions is outputted, may be determined in the following manner:

For example, a rate of change of the steering torque per unit time detected by the torque detector 1 in the dead zone, is higher than a predetermined rate.

In this embodiment, the phase compensation circuit 6 is provided for ensuring a quick response by advancing the phase. Specifically, a differentiating circuit is used for the phase compensation circuit 6. This differentiating circuit includes an amplifying section and a differentiating section, and a value obtained when the amplifying section output and the differentiating section output are added is outputted from the CPU 7. Under the condition that the torque is T0, zero torque is outputted from the amplifying section, and under the condition that the torque is not T0 and the steering torque is changed, a value obtained when the amplifying section output and the differentiating section output are added, is outputted. In the case where the steering torque is not changed, the differentiating section output becomes zero, so that a value of constant torque is outputted.

In the above embodiment, an example is shown, in which both the rightward and leftward signals are outputted from the torque signal direction determining device in the case where the switching signal 29 is L in the dead zone. However, only a signal of which the direction is the same as that of the substantial torque may be outputted.

Embodiment 2

Figure 4:
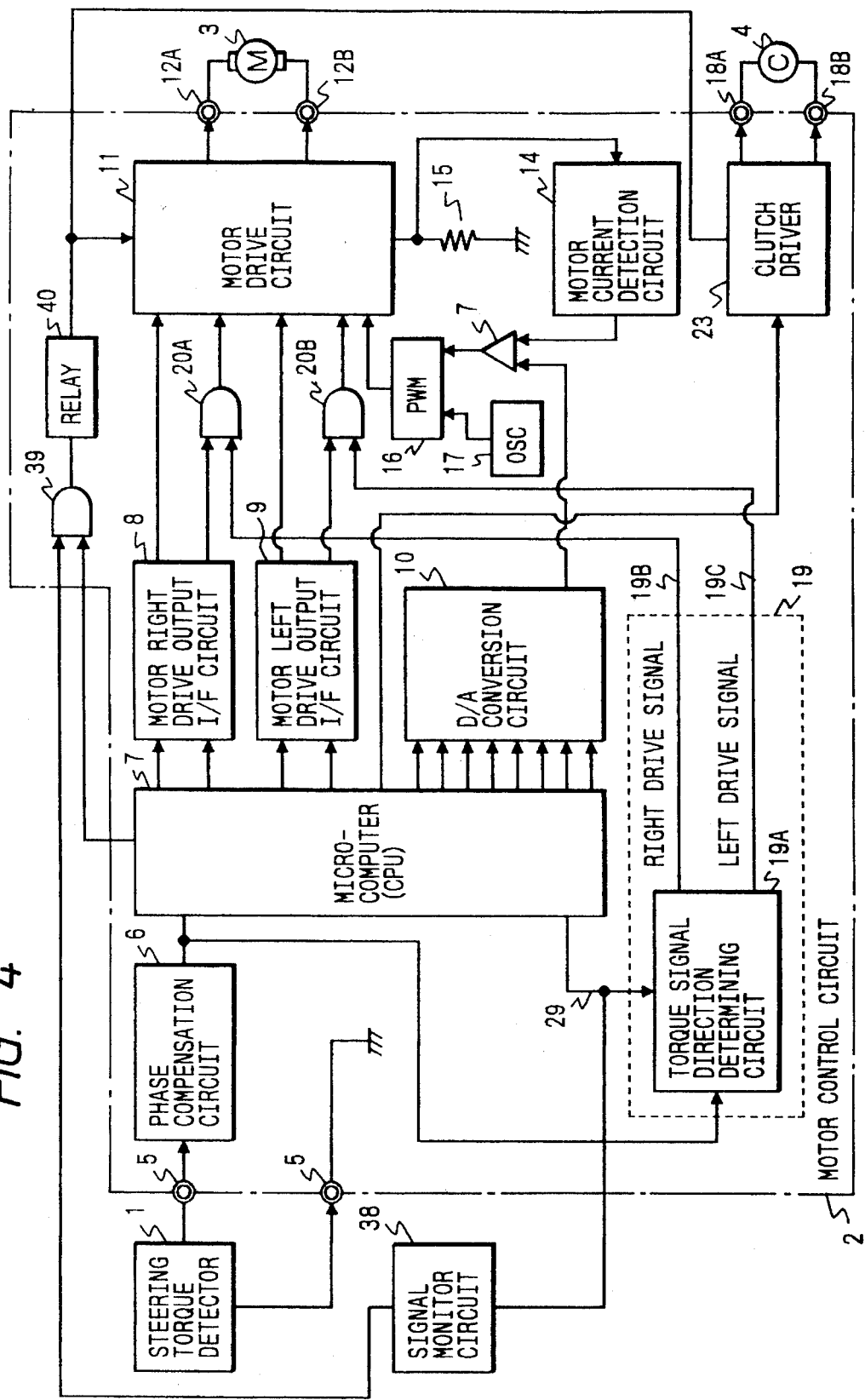
FIG. 4 is a view showing the construction of the power steering control unit of the second embodiment of the present invention.
Figure 5:
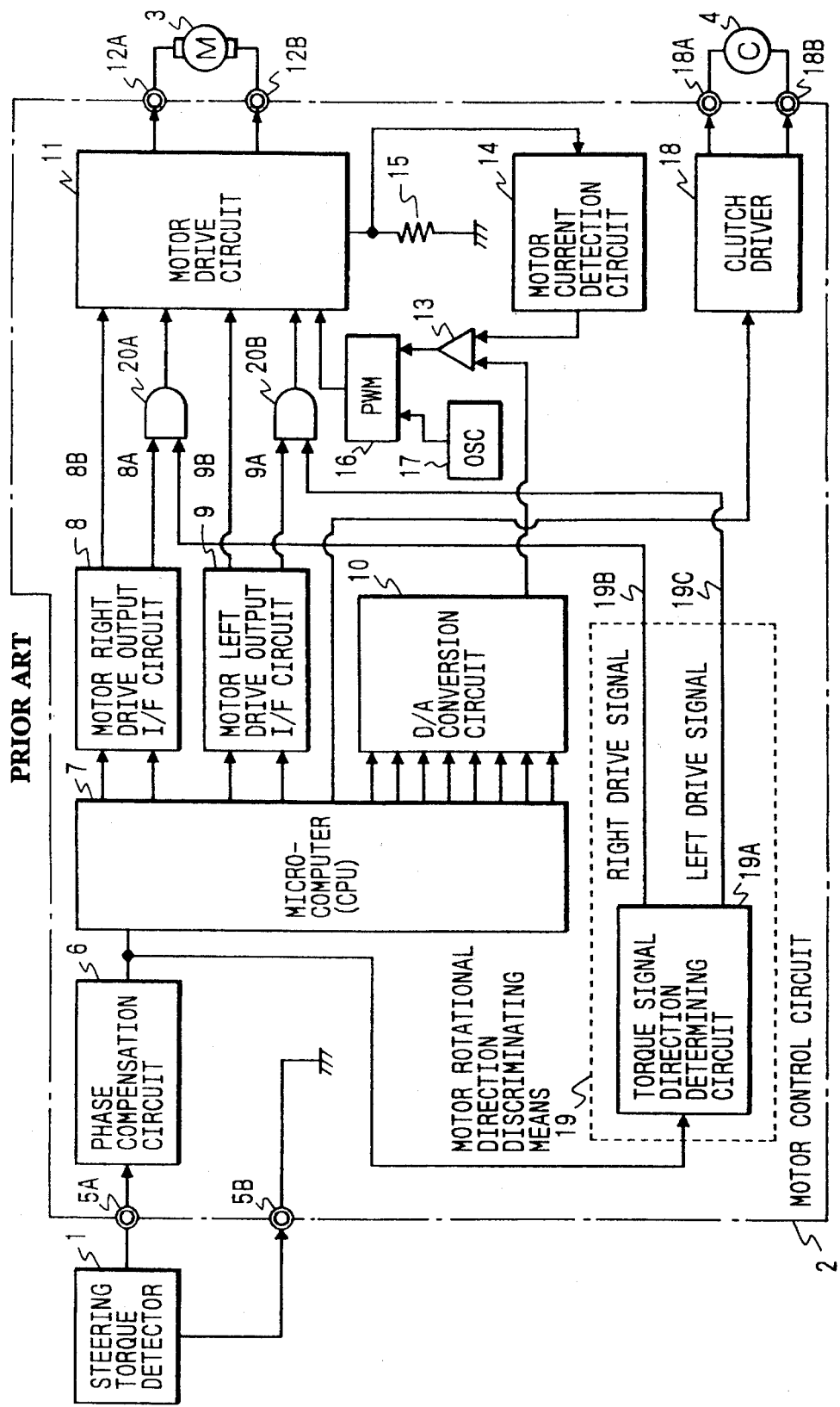
FIG. 5 is a view showing the construction of the conventional power steering control unit.

With reference to FIG. 4, Embodiment 2 will be explained as follows.

In the drawing, reference numeral 38 is a signal monitor circuit for monitoring the duration in which the L signal is outputted from the CPU 7 as the switching signal 29.

Reference numeral 39 is an AND circuit into which a signal sent from the signal monitor circuit 38 and that sent from the CPU 7 are inputted.

Reference numeral 40 is a relay. In this case, the relay 40 has a contact point which is usually closed. The relay 40 is connected with the motor drive circuit 11 and the clutch driver 18.

Other construction is the same as that of Embodiment 1.

Next, the operation of this Embodiment 2 will be explained as follows.

The signal monitor circuit 38 outputs an H signal to the AND circuit 39 except when the switching signal (L signal) for permitting the motor to assist the steering shaft with rotation even in the dead zone is continuously outputted from the CPU 7 for not less than a predetermined period of time. In the case where the CPU 7 outputs a normal signal, an H signal is outputted to the AND circuit 39 from the CPU 7. Consequently, in the case where the switching signal (L signal) for permitting the motor to assist the steering shaft with rotation is outputted from the CPU 7 for not more than a predetermined period of time, and also in the case where the CPU normally outputs a signal, the AND circuit 39 outputs an H signal. As a result of the foregoing, the relay 40 is maintained in an ON condition, so that both the motor 3 and the clutch 4 can be operated.

On the other hand, when the signal monitor circuit 38 detects that the signal (L signal) for permitting the motor to assist the steering shaft with rotation has been continuously outputted for not less than a predetermined period of time, an L signal is outputted into the AND circuit 39. As a result, the L output is sent from the AND circuit 39. Therefore, the relay 40 is cut off, so that the motor 3 and the clutch 4 are not operated. In this case, the reason why the signal monitor circuit 38 outputs the L signal in the case where the aforementioned L signal has been continuously outputted for not less than a predetermined period of time, will be described as follows: Usually, the signal for permitting the rotation of the motor in both directions is temporarily generated in the case where the steering torque is suddenly changed, for example, in the case where the steering wheel is suddenly reversed by the driver. Therefore, the duration of the permission signal is short. Accordingly, when this permission signal is continuously outputted over a long period of time, this signal is assumed to be an abnormal signal so that a fail-safe measure can be taken.

Even when the CPU itself generates an abnormal signal, the AND condition is not satisfied in the AND circuit 39, and the relay 40 is cut off.

Embodiment 3

In the Embodiment 1, the dead zone is provided in the middle of the steering torque detection values, and in this dead zone, either the switching signal for permitting the motor to rotate in both directions or the switching signal for prohibiting the motor to rotate, is outputted. The foregoing is made to be the condition to determine whether a signal necessary for assisting the steering shaft to rotate in a predetermined direction is outputted or not.

However, when the width of the dead zone is changed over into multi-steps in accordance with the result of the calculation of the CPU 7, excellent steering feelings can be ensured when the steering wheel is suddenly reversed by the driver. For example, in the case where the direction of steering torque is varied at a speed not less than a predetermined value, the width of the dead zone may be reduced. When the width is changed over, the switching signal may be used, and the number of the switching signals may be increased.

In the embodiment described above, the torque detector 1 is provided with the phase-compensation circuit 6 in series, and the steering torque value subjected to phase-compensation is used as a new steering torque detection value. However, the phase-compensation circuit 6 may not be provided, and when the steering torque detection value is directly inputted into the CPU 7 and the torque signal direction determining device 19, a portion of the calculation of phase-compensation or the entire calculation may be directly conducted by the CPU 7.

Further, in the above embodiment, the power steering control unit is provided with the clutch 4, however, the clutch is not necessarily provided. In the case where the apparatus is out of order, only the motor 3 may be stopped.

Further, the AND circuits 20A and 20B into which both the drive signal sent from the CPU 7 and the signal sent from the torque signal direction determining device 19 are inputted, are provided only on the leads of the first rightward and leftward drive signals 8A and 9A, however, the AND circuits 20A and 20B may be provided on the leads of the second rightward and leftward drive signals 8B and 9B.

According to the present invention, in the case where the steering torque is in the dead zone, only when the direction of the output signal sent from the control means and that of the signal sent from the torque signal direction determining device are coincident, the drive signal of that direction is outputted into the motor control means. Accordingly, even when the control means is out of order, it is possible to prevent the motor from rotating by itself arbitrarily. Therefore, the safety of power steering can be ensured.

On the other hand, in a predetermined case, a signal in the predetermined direction is outputted from the torque signal direction determining device by the switching signal sent from the control means even in the dead zone. Therefore, even in the dead zone, the motor can assist the steering shaft with rotation in the case where the direction of steering wheel torque is suddenly changed, for example, in the case where the steering wheel is suddenly reversed by the driver. Consequently, excellent steering feelings can be ensured.

Especially when the control is carried out on the basis of a change in the steering torque per unit time, the time at which the direction of steering wheel torque is suddenly changed can be specifically and precisely detected, so that the steering shaft can be positively assisted with rotation by the motor when the steering torque is in the dead zone.

Furthermore, even in the case where the width of the dead zone is varied by the control device, when the width of the dead zone is reduced as described above at the time when the direction of steering torque has been suddenly changed, the steering shaft can be assisted by the motor with rotation and its assistance range can be extended in accordance with the steering torque. Consequently, steering feelings can be improved.

Furthermore, according to the present invention, the duration of the switching signal by which a signal of a predetermined direction can be outputted even in the dead zone, is detected by the signal monitor device. When it is detected by the signal monitor device that the duration continues for not less than a predetermined period of time, the motor drive is stopped. In this way, malfunction of the motor due to the abnormality of the control device can be prevented, and the safety can be improved.

Moreover, the steering torque detection value is subjected to phase-compensation by the phase-compensation circuit. Therefore, a quick response can be obtained with respect to a change in the steering torque value. Consequently, power steering control conducted in quick response to a change in the steering torque can be realized.

What is claimed is:

1. An electrically operated power steering device comprising:

a steering torque detector for detecting a steering torque;

a control means for outputting a signal corresponding to said steering torque when a signal corresponding to said steering torque is inputted;

a torque signal direction determining device for outputting a signal corresponding to a direction of said steering torque when said steering torque is out of a dead zone which is set close to a neutral point of the steering after an output of said steering torque detector has been inputted into said torque signal direction determining means;

a coincidence determining means for outputting a signal when a direction of a signal sent from said control means and that of a signal sent from said torque signal direction determining means are coincident;

a motor drive means for outputting an assist torque in accordance with signals inputted into said motor drive means from said control means and said coincidence determining means; and a motor for assisting the steering shaft with rotation being driven by an output of said motor drive means, wherein a signal of a predetermined direction is capable of being outputted from said torque signal direction determining means even in said dead zone, based on a switching signal that is received from said control means.

2. The electrically operated power steering unit according to claim 1, further comprising:

a signal monitor means for detecting the duration of a switching signal by which said signal of the predetermined direction can be outputted even in said dead zone; and a motor stop means for stopping said motor when said duration is detected to be longer than a predetermined period of time by said signal monitor means.

3. The electrically operated power steering unit according to claim 1, wherein a switching signal capable of causing the output of a signal corresponding to a direction of steering torque even in said dead zone is outputted when said control means detects a change in the steering torque per unit time by not less than a predetermined amount.

4. The electrically operated power steering unit according to claim 1, further comprising a phase-compensation circuit into which a steering torque value detected by said steering torque detector is inputted, said phase-compensation circuit outputting a torque value obtained when said steering torque detection value is subjected to phase compensation.

5. An electrically operated power steering unit comprising:

a steering torque detector for detecting a steering torque;

a control means for outputting a signal corresponding to said steering torque when a signal corresponding to said steering torque is inputted;

a torque signal direction determining means for outputting a signal corresponding to a direction of said steering torque when said steering torque is out of a dead zone which is set close to a neutral point of the steering after an output of said steering torque detector has been inputted into said torque signal direction determining means;

a coincidence determining means for outputting a signal when a direction of a signal sent from said control means and that of a signal sent from said torque signal direction determining means are coincident;

a motor drive means for outputting an assist torque in accordance with signals inputted into said motor drive means from said control means and said coincidence determining means; and a motor for helping the steering shaft with rotation being driven by an output of said motor drive means, wherein a width of said dead zone can be varied by said control means.

6. The electrically operated power steering unit according to claim 5, further comprising a phase-compensation circuit into which a steering torque value detected by said steering torque detector is inputted, wherein said phase-compensation circuit outputs a torque value obtained when said steering torque detection value is subjected to phase compensation.

* * * * *